No. 804,988. PATENTED NOV. 21, 1905.
C. H. TREAT.
LUBRICATING SYSTEM.
APPLICATION FILED JUNE 26, 1905.
4 SHEETS—SHEET 4.
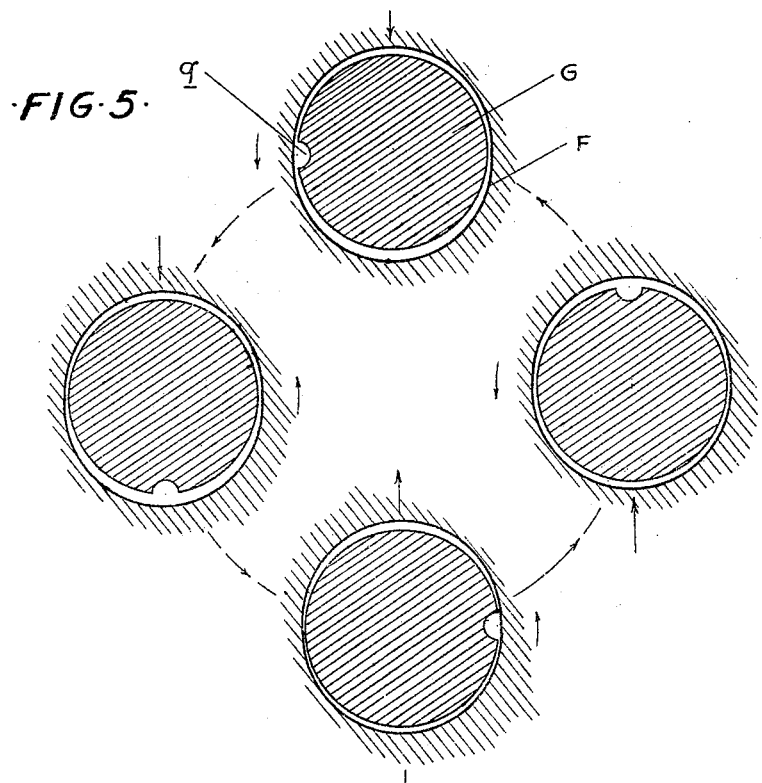
FIG. 5.
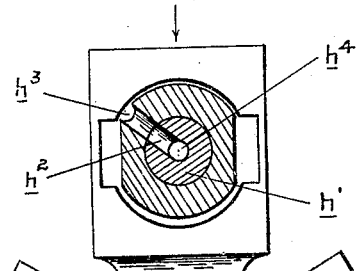
FIG. 6.
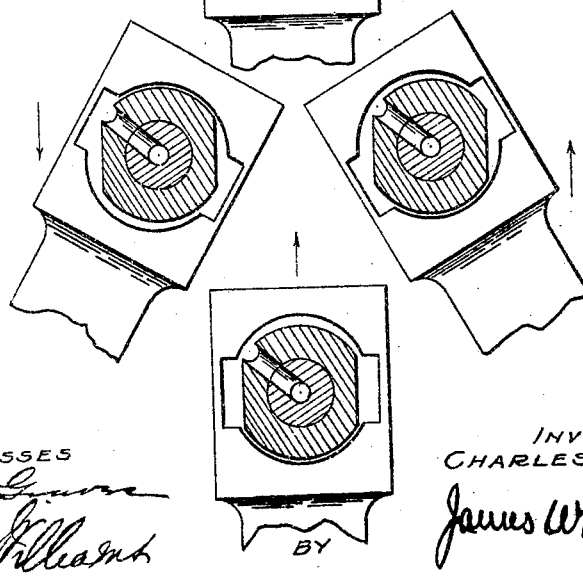
WITNESSES
INVENTOR
CHARLES H. TREAT
BY James Whittemore ATT'Y.

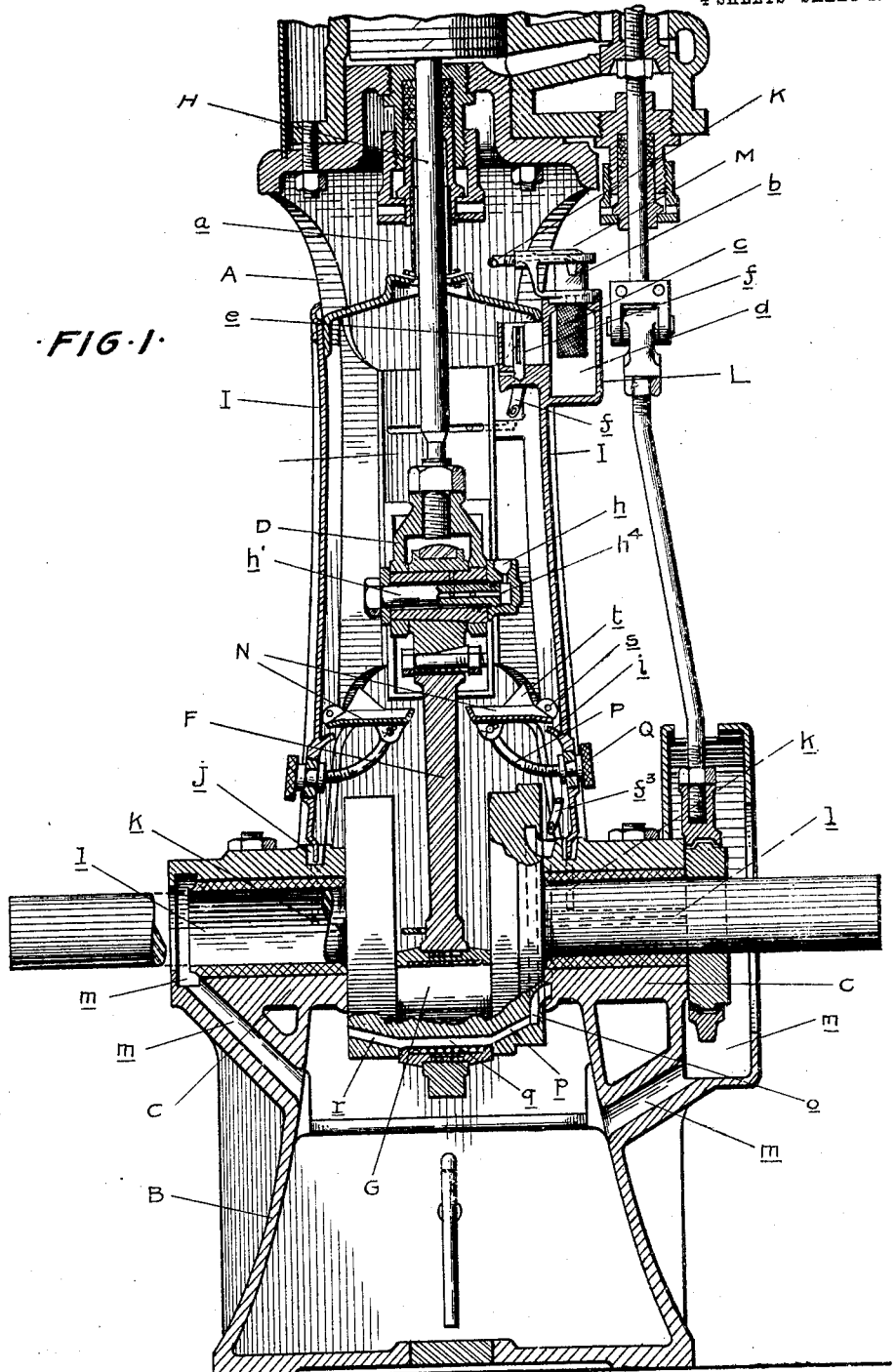

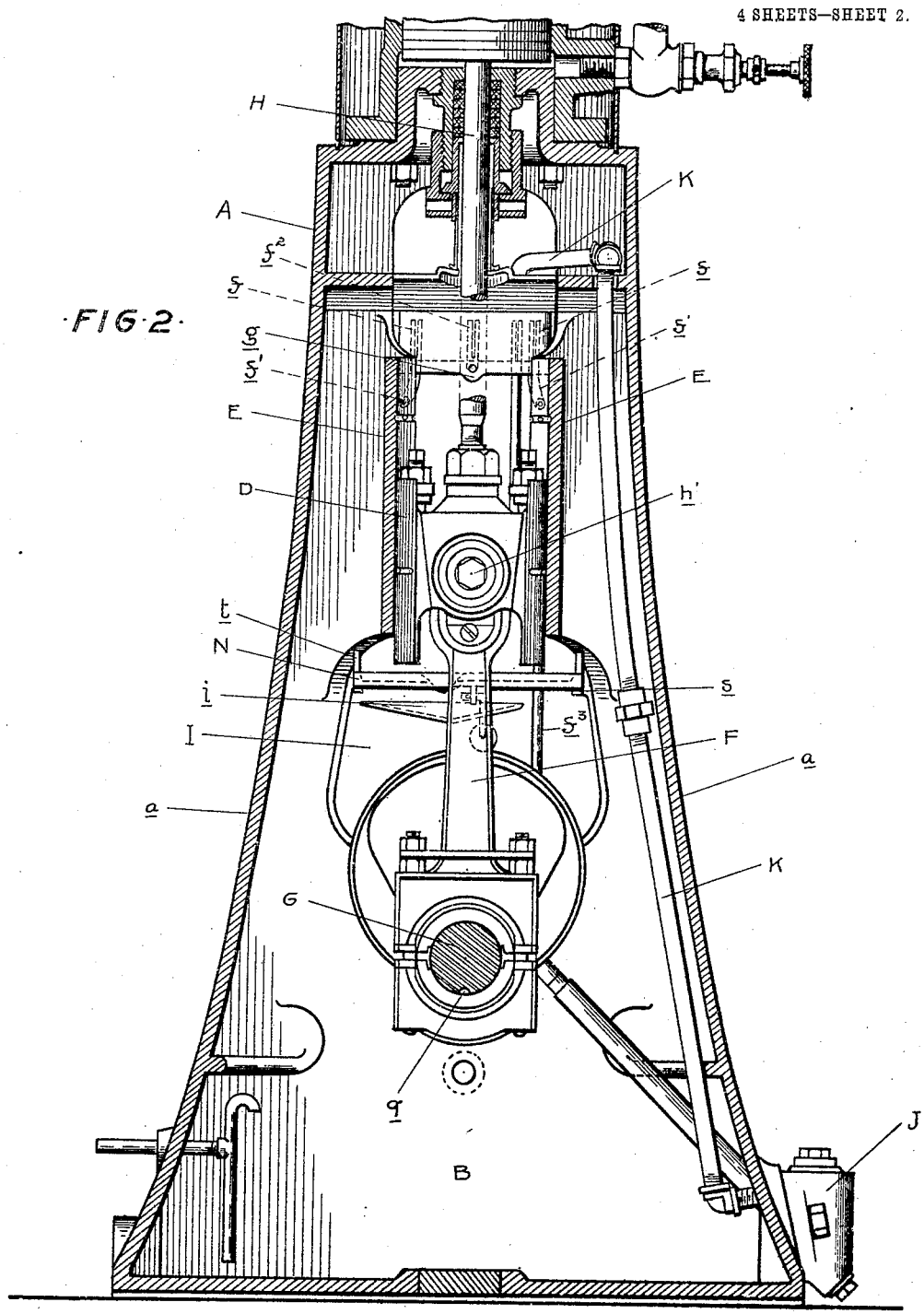

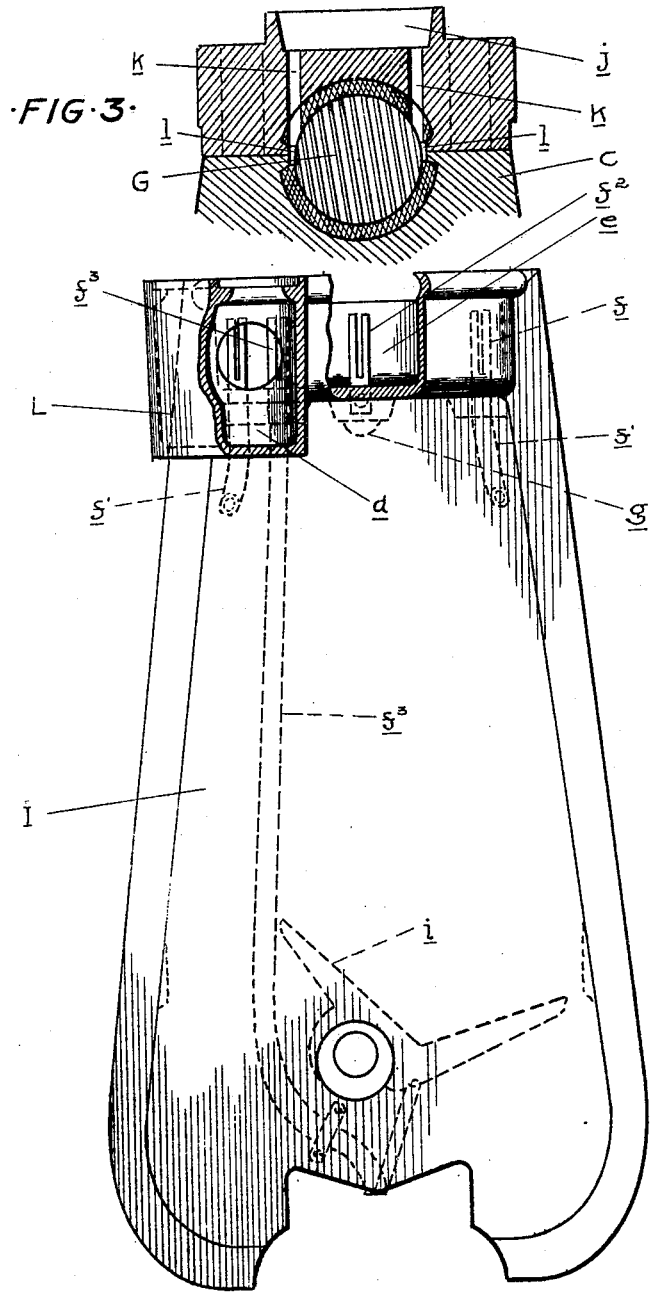

UNITED STATES PATENT OFFICE.

CHARLES H. TREAT, OF DETROIT, MICHIGAN, ASSIGNOR TO AMERICAN BLOWER COMPANY, OF DETROIT, MICHIGAN, A CORPORATION OF MICHIGAN.

LUBRICATING SYSTEM.

No. 804,988.  Specification of Letters Patent.  Patented Nov. 21, 1905.

Application filed June 26, 1905. Serial No. 267,138.

*To all whom it may concern:*

Be it known that I, CHARLES H. TREAT, a citizen of the United States, residing at Detroit, in the county of Wayne and State of Michigan, have invented certain new and useful Improvements in Lubricating Systems, of which the following is a specification, reference being had therein to the accompanying drawings.

The invention relates to lubricating systems in which a plurality of bearings are supplied with lubricant from a common source, the invention being more particularly designed for the lubrication of bearings of an engine.

The various lubricating systems that have heretofore been employed may be classified as belonging to two types, of which the one might be designated as the "gravity-feed" and the other as "force feed." Each system has its advantages and also its disadvantages; and it is the object of the present invention to obtain a system combining the advantages and eliminating the defects of the two types.

In the drawings, Figure 1 illustrates a vertical longitudinal section through an engine to which my improved system is applied. Fig. 2 is a vertical section taken in a plane at right angles to Fig. 1. Figs. 3 and 4 are diagrammatic views, respectively, illustrating the cross-head and the crank-pin bearings in different positions and subjected to different stresses. Figs. 5 and 6 are diagrams, respectively, of the crank-pin bearing and wrist-pin bearing, illustrating the feeding of the lubricant.

A common defect of lubricating systems of the force-feed type is that the oil or lubricant is liable to leak out from one of the bearings of the system which is not sufficiently oil-tight, thereby robbing the other bearings or interfering with the feeding thereto by the reduction in pressure. On the other hand, where the bearings are sufficiently tight to prevent leakage a slight impediment will frequently clog the oil-passage, so that no lubricant reaches the bearing-surface. In the present system the lubricant is distributed to the various bearings by gravity-feed; but the introduction of the oil in each bearing is such that when the maximum stress is exerted upon the bearing-surface the lubricant thereon is trapped, so as to be under pressure. Provision is also made for proportioning the quantities of lubricant distributed to the different bearings which is proportional to the supply, thereby preventing any one defective bearing from robbing all the rest.

As shown, A is the frame of an upright engine, having a hollow base B and crank-shaft bearings C thereon. D is the cross-head, E the guideways therefor, F the connecting-rod, G the crank, and H the piston-rod, all of the usual construction. The frame A is formed with two oppositely-arranged imperforate sides $a$, which form part of an inclosing casing, and I represents detachable panels for completing the other two sides of the casing.

The lubricant which is used is stored in the chamber within the hollow base B and is elevated by a pump J and through a conduit K to a tank L, from which it is distributed to the various bearings. This tank is supported upon and preferably formed integral with one of the removable panels I, and as shown, the oil enters the tank outside of the casing, passing through a sight-feed M. Thus the feeding of the oil may be observed without opening of the engine-casing.

The sight-feed is preferably formed by a transparent tube $b$, which is secured to the discharge end of the oil-supply pipe and is not connected with the tank L, so that the latter may be moved without disturbing the pipe connection. A strainer $c$ is preferably arranged within the tank L for removing any impurities from the lubricant which is distributed to the bearings.

The tank L has a portion $d$ thereof which is arranged on the outside of the panel and contains the strainer $c$, while another portion $e$ of the tank is formed on the inner side of the panel and forms the distributing-reservoir. Connected with this reservoir $e$ are a plurality of discharge-pipes $f$, through which the oil is distributed to the bearings. These tubes $f$ preferably extend upward within the tank near the upper end thereof, and each tube is longitudinally slotted to form a narrow restricted passage for the oil. The purpose of this slot is to proportion the feed of the oil through the several tubes when the oil within the tank stands at different heights, and this prevents any one of the tubes from robbing the other.

Two of the discharge-tubes $f f'$ lead to the slideways for the cross-head and distribute oil thereto. A third tube $f^2$ has its discharge end in a lug or downward projection $g$, from which the lubricant drips into a cup $h$ on the cross-head. This cup, as shown, is formed in the nut of a clamping-bolt $h'$, which passes through the wrist-pin of the cross-head, and a channel $h^4$ is formed in this bolt communicating with the cup and centrally communicating with ports $h^2$, passing through the wrist-pin and connecting with a longitudinal channel $h^3$ in its outer face. This channel $h^3$ does not extend the entire length of the pin, but is of sufficient length to distribute the oil over the great portion of the bearing-surface. Another discharge-tube $f^3$ leads downward adjacent to the inner face of the panel I and conveys the lubricant to the crank-pin bearing, as hereinafter set forth. The lubricant passing through the distributing-tubes $f$ $f'$ onto the slideways will drip from the lower ends of the latter onto pans N, which are carried by the panels I, and from these pans the lubricant is discharged onto inclined flanges $i$, formed on the inner face of the panels. At the lowest point of these flanges is an aperture through which the lubricant passes, following the inner face of the panel to the lower edge thereof which forms a drip-point for discharging the lubricant into a cup $j$ in the crank-shaft bearing. From these cup-channels $k$ lead downward on opposite sides of the bearing and communicate with longitudinally-extending channels $l$ therein. The opposite ends of the longitudinal channels $l$ are open to discharge the lubricant, which on the one side passes into a channel $m$, extending downward into the chamber-base and on the other side communicates with channels in the eccentric, being finally discharged through a downwardly-inclined channel $m'$ into the base. Thus the lubricant which is first used for the cross-head slideways also lubricates the crank-shaft bearings and other bearing-surfaces on the crank-shaft.

The crank-pin is lubricated by the lubricant passing through the pipe $f^3$, which at its lower end communicates with an annular channel $o$, formed in the outer face of the crank-disk. Connecting with this annular channel is an inclined channel $p$ extending into the crank-pin and communicating with a longitudinal groove $q$ in the face thereof, and at the opposite end of the groove $q$ is an oppositely-inclined discharge channel $r$, from which the oil drips into the base.

In all of the bearings described the arrangement of the oil-passages is such as to distribute the oil or lubricant to the bearing-faces and also to provide a continuous passage through which the oil is discharged. Thus any sediment carried in with the lubricant instead of remaining in the bearing, as would be the case with the pressure systems of lubrication, will be carried away by the discharging oil. Another object which is attained by the peculiar arrangement of the oil-channels in the bearings is that the lubricant passes between the adjacent bearing-surfaces at a time when there is no mechanical stress exerted to press the surfaces together, and during the period when the bearing-surfaces are pressed together communication with the discharge-channel is cut off. Thus the lubricant is trapped into the bearing and is prevented from being squeezed out even where great pressure is exerted.

To accomplish the purpose just referred to in the specific construction of the wrist-pin bearing, the lubricant passes first from the receiving-cup $h$ into the channel through the bolt $h'$ and ports $h^2$ into the longitudinal channel $h^3$. This channel $h^3$ is arranged at a point in the circumference of the wrist-pin, from which the lubricant is free to pass into the lower half of the bearing during the downward stroke of the piston and into the upper half of the bearing during the upward stroke; but the portions of the bearing which are under stress at any time are cut off from communication with the channel. A similar result is obtained in the crank-shaft bearings in which the lubricant passing along the longitudinal channels $l$ may freely enter between the shaft and upper bearing when a downward stress is exerted upon the shaft and will pass between the shaft and the lower bearing when an upward stress is exerted. This effect is due to the arrangement of the longitudinal channels $l$ at the sides of the bearing instead of at the top and bottom, and as a consequence at the time when the adjacent bearing-surfaces are pressed toward each other the discharge of the lubricant is cut off.

In the crank-pin bearing the lubricant passes from the pipe $f^2$ into the annular channel $j$ and from the latter through the inclined channel $p$ to the longitudinal channel $q$ in the crank-pin. This channel is also arranged at a point in the circumference of the pin where it will distribute oil between the portions of the bearing and the pin which are not under stress and will be cut off from the portions upon which stress is exerted. At the same time the free discharge of the lubricant from the channel $q$ is maintained through the discharge-channel $r$.

In the operation of the engine the pump J will constantly elevate the oil from the chamber in the base B to the tank L, where after passing through the sight-feed M it will be strained and then passed into the discharge portion $e$ of the tank. Here it will be distributed into the force-tubes $f$ $f'$, &c., and will pass therefrom to the bearings and from one bearing to another until finally returned to the chamber within the base. A strainer O is also preferably arranged in the upper portion of the chamber within the base to remove any impurities from the oil. Whenever it is desired to have access to the mechanism within the crank-case, the panels I may be removed without disconnecting any pipe connections.

To lock the panels I in position, I preferably make use of the drip-pans N, which to this end are pivotally secured at $s$ to the panels and are provided with locking-lugs $t$, which engage with bearings upon the frame A when said pans are in horizontal position. The pans are adjusted in angularity by curve links P, which pass outward through the panel and are threaded to engage an adjusting-nut Q. Thus by turning the nut Q the pans may be drawn up into a position where the lugs $t$ will lock the panels from disengagement, and by turning the pans downward the panels are unlocked.

In Figs. 5 and 6 is illustrated diagrammatically the manner of feeding the oil between the bearing-surfaces, respectively, of the crank-pin and the wrist-pin. As shown in Fig. 5, the crank-pin G is illustrated at four different points in its movement. In its uppermost position the channel Q is on the left-hand side of the pin in substantially the horizontal plane of the axis and the pressure is between the upper surface of the bearing and the pin, as indicated by the arrow. Thus the lower surface of the bearing is separated from the pin by a greater space than between the upper surface and the pin, which permits the oil to flow in from the channel Q. In passing from this position to the position at the left of the figure the channel Q moves through one-quarter of a revolution in relation to the bearing, wiping over the surface which is not under stress, and this action is continued to the position shown at the bottom of the figure, where the channel is on the right-hand side. At this point the stress on the bearing is reversed and is exerted in an upward direction, as indicated by the arrow. This separates the upper portion of the bearing from the pin, while the lower portion is pressed toward the pin; but by reason of the fact that the oil between the lower surface of the bearing and the pin is trapped these surfaces are prevented from contacting and the pin is in reality floated upon the surface of the oil. During the upward movement of the pin, the immediate position of which is indicated on the right-hand side of Fig. 5, the oil-channel Q wipes over the upper face of the bearing, as was previously done with the lower face during the downward stroke. This thoroughly lubricates said face and fills the space between the bearing and the pin with oil, so that when the stress is reversed at the upper end of the stroke of the piston a quantity of oil will be trapped between the bearing and the pin, as has already been described. A similar effect is produced in the wrist-pin bearing in the cross-head, as illustrated in Fig. 6. In the upper position the channel $h^3$ is at the left-hand side of the upper bearing-surface. As the cross-head descends the connecting-rod is inclined, as indicated on the left-hand side of the figure, which places the channel $h^3$ in communication with a channel $h^4$, formed by cutting away the bearing, and this permits the oil to flow downward between the separated faces of the lower portion of the bearing and the wrist-pin, the stress being meanwhile exerted on the upper face of the pin. At the lower position in the figure the stress is reversed and the trapped oil floats the pin during the upward movement, while the channel $h^3$ wipes over the upper face of the bearing and fills the space between the same and the pin with oil preparatory for the reversal in stress. The principle underlying both of these constructions is identical and is the feeding of the oil between the separated faces of the bearing while relieved from stress and trapping it between said faces when under stress. To more clearly illustrate this, the spaces between the pins and the bearing have been greatly exaggerated in the drawings.

What I claim as my invention is—

1. A lubricating system for distributing oil to a plurality of bearings comprising an elevated tank for the lubricant, a plurality of discharge-tubes connected therewith and leading to the different bearings, and means for proportioning the discharge of the oil when at different levels in the tank between the various tubes.

2. A lubricating system for distributing lubricant to a plurality of bearings comprising an elevated tank, a plurality of discharge-tubes connecting thereto and leading to the various bearings, and vertically-slotted upward projections of said discharge-tubes within said tank, through which the lubricant is discharged when at different levels and is proportioned to each tube.

3. A lubricating system for distributing oil to a plurality of bearings, comprising a receptacle for the lubricant, a plurality of discharge-tubes connected therewith and leading to the different bearings, said tubes being arranged to receive lubricant in proportion to the height of the lubricant in said receptacle.

4. In a lubricating system, the combination with a bearing, of a gravity-feed connection thereto for the lubricant a constantly open discharge from said connection, and a lateral discharge from said connection between the bearing-surfaces.

5. In a lubricating system, the combination with a bearing having different portions thereof under stress at different times, of a channel for supplying the lubricant to the portions of the bearing while relieved from stress, and means whereby said channel is disconnected from said portions of the bearing while under stress.

6. In a lubricating system, the combination with a bearing for a revoluble member upon which stress is exerted alternately upon opposite sides, of a longitudinally-extending oil-distributing channel arranged to communicate with the opposite portions of said bearing while they are respectively relieved from stress and to be cut off from communication therewith while under stress.

7. In a lubricating system, the combination with a bearing for a revoluble member upon which stress is exerted alternately in opposite directions, of an oil-distributing channel extending longitudinally of said bearing intermediate the points of alternate maximum stress.

8. In a lubricating system, the combination with a series of bearings and a gravity oil-feed extending from one bearing to another, of oil-feeding passages for each bearing laterally connecting with said gravity-feed.

9. In a lubricating system for steam-engines, the combination with an engine-frame, of a panel detachably connected to said frame forming a portion of the inclosing casing, a gravity oil-feed extending to a bearing within the casing, and a lubricant-tank for supplying the lubricant to said gravity system, mounted upon said detachable panel.

10. The combination with a vertical engine, of a panel detachably connecting with the engine-frame and forming a part of the inclosing housing, a tank for the lubricant mounted upon said panel, and drip connections with said tank for distributing the lubricant to the various bearings.

11. The combination of an upright steam-engine, of a panel detachably connecting with the engine-frame and forming a part of the inclosing housing, a tank for the lubricant mounted upon said panel and having a portion outside and a portion within the casing, distributing connections from the portion of the tank within the casing and the sight-feed-supply connection to the portion of the tank without the casing.

12. The combination with an upright engine, of a casing inclosing the crank and cross-head, a tank for the lubricant mounted on the upper portion of said casing and having a portion thereof within the casing and a portion without the same, distributing connections to the bearings leading from the portion within the casing, and a sight-feed-supply connection to the portion without the casing.

13. The combination with an upright engine and an inclosing casing for the cross-head and crank, of a tank for the lubricant mounted on the upper portion of said casing, and a drip connection from said tank to said cross-head.

14. The combination with an upright engine and a casing inclosing the cross-head of the crank thereof, of a lubricant-tank mounted on the upper portion of said casing, of a distributing connection from said tank to the slideways of said cross-head, and a drip-pan at the lower end of said slideways for receiving the lubricant therefrom and directing it to the crank-shaft bearing.

15. The combination of an upright engine and a casing inclosing the cross-head and crank thereof, of a tank for the lubricant mounted on the upper portion of said casing, a discharge connection from said tank to the slideway for said cross-head, a drip-pan beneath said slideway for receiving the lubricant therefrom and directing it against the side of said casing, and a discharge-point on said casing beneath said pan for directing the lubricant to a bearing for the crank-shaft.

16. The combination with an upright engine and an inclosing casing for the cross-head and crank, a tank for the lubricant mounted on the upper portion of said casing, distributing connections leading from said tank to the cross-head ways, the cross-head and the crank-bearings, and drip connections for delivering the lubricant from said ways to the crank-shaft bearings.

17. In a lubricating system, the combination with a bearing alternately subjected to and relieved from stress, of means for flushing the bearing-surface with lubricant while relieved from stress.

18. In a lubricating system, the combination with a bearing alternately subjected to and relieved from stress, of means for flushing the bearing-surface with lubricant while relieved from stress, and for restricting the escape of the lubricant from said surface while under stress.

19. In a lubricating system, the combination with a bearing having portions of its surface periodically subjected to stress, of means for feeding the lubricant to the portions of said surface relieved from stress, and for restricting the escape of lubricant from the portions of the surface under stress.

20. In a lubricating system, the combination with a bearing having portions of the surface thereof subjected to stress at different times and alternately relieved from stress, of an oil-feeding channel communicating with the portions of said surface relieved from stress, and having its communication with the portions of the bearing under stress restricted.

In testimony whereof I affix my signature in presence of two witnesses.

CHARLES H. TREAT.

Witnesses:
EDWARD D. AULT,
JAMES P. BARRY.